United States Patent [19]

Harada et al.

[11] Patent Number: 6,132,890
[45] Date of Patent: Oct. 17, 2000

[54] HIGH-TEMPERATURE SPRAY COATED MEMBER AND METHOD OF PRODUCTION THEREOF

[75] Inventors: Yoshio Harada; Tatsuo Suizu; Takema Teratani, all of Hyogo, Japan

[73] Assignee: Tocalo Co., Ltd., Hyogo, Japan

[21] Appl. No.: 09/147,291

[22] PCT Filed: Mar. 23, 1998

[86] PCT No.: PCT/JP98/01238

§ 371 Date: Nov. 20, 1998

§ 102(e) Date: Nov. 20, 1998

[87] PCT Pub. No.: WO98/42887

PCT Pub. Date: Oct. 1, 1998

[30] Foreign Application Priority Data

Mar. 24, 1997 [JP] Japan .................................. 9-088822

[51] Int. Cl.⁷ .............................. B32B 15/00; B05D 1/02
[52] U.S. Cl. ...................... 428/678; 428/668; 428/679; 428/680; 428/685; 428/937; 427/422; 427/424; 427/427
[58] Field of Search ..................... 428/668, 678, 428/679, 685, 680, 937; 427/422, 424, 427

[56] References Cited

U.S. PATENT DOCUMENTS

| | | | |
|---|---|---|---|
| 3,754,903 | 8/1973 | Goward et al. ........................ | 75/171 |
| 4,687,678 | 8/1987 | Lindblom . | |
| 5,082,741 | 1/1992 | Taira et al. .......................... | 428/469 |
| 5,277,936 | 1/1994 | Olson et al. .......................... | 427/453 |
| 5,397,649 | 3/1995 | Schienle et al. ...................... | 428/552 |
| 5,455,119 | 10/1995 | Taylor et al. . | |
| 5,912,087 | 6/1999 | Jackson et al. ....................... | 428/610 |

FOREIGN PATENT DOCUMENTS

| | | |
|---|---|---|
| 55-104471 | 8/1980 | Japan . |
| 56-51567 | 5/1981 | Japan . |
| 61-10034 | 3/1986 | Japan . |
| 3-207849 | 9/1991 | Japan . |
| 4-323357 | 11/1992 | Japan . |
| 98/42888 | 10/1998 | WIPO . |

OTHER PUBLICATIONS

English Language Abstract of JP No. 3–207849.
English Language Abstract of JP No. 56–51567.
English Language Abstract of JP No. 55–104471.
English Language Abstract of JP No. 4–323357.

*Primary Examiner*—Timothy M. Speer
*Assistant Examiner*—Bryant Young
*Attorney, Agent, or Firm*—Greenblum & Bernstein P.L.C.

[57] ABSTRACT

In order to advantageously solve problems such as lowering of the productivity, contamination of alloy coating due to the adoption of different metal, increase of the cost due to the adoption of different coating process, a coating of MCrAlX alloy is directly formed on a substrate surface of a member exposed to a high temperature at a thickness of 10~300 μm through atmospheric plasma spraying process in air or flame spraying process (including low-velocity flame spraying process, high-velocity flame spraying process) and thereafter the same MCrAlX alloy is applied thereonto at a thickness of 100~800 μm through low pressure plasma spraying process in a non-oxidizing atmosphere.

13 Claims, 2 Drawing Sheets

HIGH-TEMPERATURE SPRAY COATED MEMBER AND METHOD OF PRODUCTION THEREOF

TECHNICAL FILED

This invention relates to a high-temperature spray coated member having an excellent high-temperature oxidation resistance as a high-temperature member such as boiler, gas turbine, jet engine, diesel engine or the like and a method of producing the same.

BACKGROUND ART

As to a high power generator such as a boiler, a gas turbine, a jet engine, a diesel engine or the like, there are many studies for mainly improving a heat efficiency. However, the improvement of heat efficiency forces a severe thermal load to a constructional part (material). As a metal material used in a high temperature portion of the high power generator, therefore, it is required to have excellent high-temperature oxidation resistance and high-temperature corrosion resistance. Particularly, if it is intended to use a fuel containing impurities such as V, Na, S and the like, since inorganic compounds containing these impurities violently corrode and wear the metallic material at a high-temperature state, it is necessary to maintain the metallic material at a stable state for a long time under such an environment.

In order to satisfy such a requirement, there have been developed many heat resistant alloys consisting essentially of nonferrous metallic elements such as Cr, Ni, Mo, Co, W, Ta, Al, Ti and the like from the old time, which are called as so-called super-alloys.

In these heat resistant alloys, however, the high-temperature strength is most preferential, so that it tends to suppress an addition amount of a metal element not serving to the improvement of the strength as low as possible. A typical example of the metal element not serving to the improvement of the strength is Cr, Al, Si or the like, but these elements are excellent in the oxidation resistance and resistance to high-temperature corrosion. Therefore, it is ordinary that the super-alloy preferentially requiring the above high temperature strength is poor in the oxidation resistance and resistance to high-temperature corrosion.

Heretofore, a metal elements such as Cr, Al, Si or the like or an alloy thereof has previously been applied to a surface of a super-alloy member used under a high temperature environment through a spraying process, a diffusion treatment method or the like to compensate for the lowering of resistance force to chemical damage of the super-alloy.

In the spraying process, it is merit that the kind of the spraying material may optionally be selected, but there is a drawback that the resulting coating is porous and is poor in the corrosion resistance and adhesion property because the treatment is carried out in air.

In this connection, there has recently been developed a method wherein plasma spraying is carried out in an argon gas atmosphere of a low pressure containing substantially no air (oxygen) (low-pressure plasma spraying process), whereby drawbacks inherent to the atmospheric-sprayed coating have largely been improved, but it can not be said that such a coating is still sufficient under recent environment exposed at higher temperature.

On the other hand, the conventional diffusion treatment method is relatively easy when Cr, Al, Si and the like are treated individually, but it is hardly said that the oxidation resistance and the resistance to high-temperature corrosion are sufficient. And also, this treatment is required to be conducted at a higher temperature state of about 1000° C., so that it has a drawback that mechanical properties of super-alloy matrix lower.

Under the above circumstances, JP-A-55-104471 proposes a method wherein Ni—Cr alloy as an oxidation-resistant metal is sprayed to conduct a diffusion treatment of Al, Cr or the like.

In this method, however, the treatment at high temperature can not be avoided, so that it is inevitable to lower the mechanical properties of the matrix though the adhesion property and denseness of the sprayed coating are improved.

On the other hand, the development of spraying materials is carried out for using under high-temperature environment. A typical material is a heat-resistant alloy material represented by MCrAlX (wherein M is a metal of Ni, Co or Fe or a mixture thereof. X is an element such as Y, Hf, Ta, Cs, Pt, Ce, Zr, La, Si, Th or the like). By plasma spraying the MCrAlX alloy under a low pressure, it is possible to form a sprayed coating having excellent oxidation resistance and resistance to high-temperature corrosion, and the performances of the high-temperature member are more improved. And also, there is proposed a method wherein the diffusion treatment of Cr, Al or the like is conducted after the formation of the MCrAlX alloy sprayed coating (e.g. JP-B-61-10034).

The service life of the member for gas turbine is fairly improved by the above recent spraying process or the development of a technique combining the spraying process and the diffusion treatment method. However, the gas temperature of the gas turbine is anticipated to reach 1500~1700° C. in future.

In the gas turbine member contacting with such a high temperature gas, even if it is reinforced with a cooling system through air or steam, it is anticipated that the temperature of the exposed member exceeds the existing 900° C. and will be 950~1050° C. For this end, it is studied to improve the high temperature strength of the member for the gas turbine (metal matrix).

However, when the alloy sprayed coating is formed on such a high temperature member (metal substrate) by the conventional method, there is a fear of causing the following problems.

(1) In the high temperature member (metal substrate), as the temperature becomes high, there is a strong tendency that an alloy component in a sprayed coating of, for example, MCrAlX alloy (wherein M is one or more of Ni, Co and Fe, X is one or more of Y, Rf, Ta, Cs, Pt, Ce, Zr, La, Si and Th) formed on the surface or a composite sprayed coating containing a diffusion layer therein diffuses and penetrates into the inside of the metal substrate and hence a thick brittle layer is created in a boundary portion between the sprayed coating and the substrate surface to easily peel the sprayed coating.

(2) Among the components of the MCrAlX alloy penetrated into the inside of the metal substrate, Al particularly reacts with Ni included in the metal substrate to produce a brittle intermetallic compound such as AlNi, AlCo or the like and has an action disappearing a high temperature strength component or precipitate existing in the substrate. As a result, the high temperature strength of the substrate as a whole lowers and it is apt to cause crack or local breakage resulted from thermal fatigue.

(3) Even in the MCrAlX alloy sprayed coating, Ni, Cr and the like being basic components diffuse to form a brittle layer, so that the resistance to thermal shock in the coating considerably lowers.

It is said that these problems result from the feature that the components of the MCrAlX alloy sprayed coating applied to the surface of the substrate diffuse and penetrate into the substrate. As a countermeasure therefor, it is considered that the prevention of diffusing and penetrating the alloying components of the sprayed coating is an effective means.

As such a means, there is a method wherein a high melting point metal (Nb, Ta) or a thin layer of (10~100 μm) of an oxide film such as $Al_2O_3$ is directly formed on the surface of the substrate through a spraying method or PVD method and the conventional MCrAlX alloy sprayed coating is formed thereon to control the internal diffusion of the MCrAlX alloying components.

In this method, however, an expensive metal different from the MCrAlX alloying components is used, or the PVD method using an electron beam as a heat source is used in the formation of $Al_2O_3$ film, so that the different film-forming process should be adopted and hence the lowering of the productivity is caused.

And also, the prevention of the internal diffusion of the alloying components by this method loses the diffusion layer required for ensuring the adhesion property between the substrate and the sprayed coating and the adhesion property of the coating considerably lowers.

It is, therefore, an object of the invention to solve the aforementioned problems of the conventional techniques and to propose a coating technique for advantageously solving problems such as lowering of productivity, contamination of alloy coating based on the adoption of different metal, cost up based on the adoption of different coating process and the like.

DISCLOSURE OF THE INVENTION

The invention does not lie in a method adopting a different film-forming means and using a different metal as in the conventional technique, but lies in a technique forming a coating having an excellent resistance to high-temperature oxidation by using same film-forming means, same metal and same metal oxide.

That is, the invention is a technique based on the following thoughts.

(1) To prevent that the components in the MCrAlX alloy sprayed coating formed on the surface of the member exposed to high temperature rapidly diffuse into the inside of the substrate through with the rise of temperature in the gas turbine.

(2) To maintain good mechanical properties over a long time by preventing the formation and growth of a modified layer having poor mechanical strength and low strength to thermal strength on the surface of high temperature substrate.

(3) To eliminate an adoption of a different film-forming method such as formation of $Al_2O_3$ underlayer thin film through PVD process or the like and formation of MCrAlX alloy sprayed coating through spraying process.

(4) To eliminate the necessity of spraying a different high-melting point metal such as Nb, Ta or the like as an undercoat prior to the spraying of MCrAlX alloy.

(5) To eliminate the degradation of resistance to high-temperature oxidation resulted from the metal-such as Nb, Ta or the like included in the MCrAlX alloy when the cleaning in the line is insufficient.

(6) In the conventional technique, the thin film such as $Al_2O_3$, Nb, Ta or the like formed as a lower layer is apt to bring about the lowering of the adhesion property of the MCrAlX alloy coating as an upper layer, so that it is difficult to form the film (when the internal diffusion of the MCrAlX alloy is prevented by $Al_2O_3$ or the like, it is apt to cause the peeling due to the lowering of the adhesion property, while when the adhesion property is improved, the diffusion of the alloy into the inside of the substrate becomes deeper, which results in the lowering of the mechanical properties of the substrate itself). In the invention, the film can be formed by a simple method without requiring the above complicated control.

The invention is developed under such thoughts as follows.

(1) It is a method wherein MCrAlX alloy is formed on a surface of a substrate in a high-temperature exposed member at a thickness of 10~200 μm through an atmospheric plasma spraying process in air atmosphere or a flame spraying process (low-velocity flame spraying process, high-velocity flame spraying process or the like) and thereafter MCrAlX alloy having the same material as mentioned above is formed thereon at a thickness of 100~800 μm through a low-pressure plasma spraying process in a non-oxidizing atmosphere.

(2) It is a method wherein MCrAlX alloy is mixed with 0.2~20 wt % of various oxide powders and directly formed on a high-temperature exposed member at a thickness of 10~300 μm through the atmospheric plasma spraying process or flame spraying process and thereafter MCrAlX alloy containing no oxide is formed thereon at a thickness of 100~800 μm through the low-pressure plasma spraying process in a non-oxidizing atmosphere.

(3) It is a method wherein the sprayed coating formed on the high-temperature exposed member by the method of the item (1) or (2) is subjected to a heat treatment in air or argon atmosphere or under vacuum, if necessary, to enhance bonding force of mutual particles constituting the MCrAlX alloy sprayed coating formed as the upper layer portion (topcoat) to conduct densification for preventing the invasion of corrosive gas component from exterior and improving the adhesion property to the lower layer portion (undercoat).

(4) It is a method wherein the composite sprayed coating after the heat treatment of the item (3) is subjected to Al diffusion or Cr diffusion treatment, if necessary, to give a higher resistance to high-temperature oxidation.

(5) The treatment of the item (4) may be carried out after the formation of the MCrAlX alloy sprayed coating of the item (1) or (2).

That is, the invention is a spray coated member for a resistance to a high-temperature environment characterized by having a composite sprayed coating comprised of an oxide-containing undercoat sprayed coating obtained by spraying a MCrAlX alloy spraying material onto a surface of a heat-resistant alloy substrate in air and a non-oxide topcoat sprayed coating obtained by spraying a MCrAlX alloy spraying material onto the undercoat under a low pressure containing substantially no oxygen.

In the invention, it is preferable that powder of one or more oxides selected from CoO, NiO, $Cr_2O_3$, $Al_2O_3$, $Y_2O_3$, MgO, $SiO_2$ and $ZrO_2$ is included in the undercoat sprayed coating.

In the invention, it is preferable that a total amount of oxide powder included in the undercoat sprayed coating is within a range of 0.2~20% by weight.

In the invention, it is preferable that it is preferable that the topcoat sprayed coating has further a Al or Cr diffused layer at its surface side.

In the invention, it is preferable that the undercoat sprayed coating has a thickness of 10~300 μm and the topcoat sprayed coating has a thickness of 100~800 μm.

In the invention, it is preferable that a thin diffusion layer of an alloying component of not more than 70 μm is formed on the surface of the substrate when being heated under conditions of 1100° C.×8 hr.

Further, the invention is a method of producing a spray coated member for a resistance to high-temperature environment, characterized in that an oxide-containing undercoat sprayed coating is formed by spraying a MCrAlX alloy onto a surface of a heat-resistant alloy substrate in air through a film-formable spraying process and then a non-oxide topcoat sprayed coating is formed thereon by spraying a MCrAlX alloy under a low-pressure containing substantially no oxygen through a film-formable spraying process.

In the invention, the production method is preferable to use a mixture of MCrAlX alloy and one or more oxides selected from CoO, NiO, $Cr_2O_3$, $Al_2O_3$, $Y_2O_3$, MgO, $SiO_2$ and $ZrO_2$ as a spraying material for the undercoat.

In the invention, it is preferable that after the formation of the topcoat coating, a heat treatment is carried out in air or argon atmosphere or under vacuum at 1000~1170° C.×1~5 hr with respect to the topcoat coating.

In the invention, it is preferable that after the formation of the topcoat, Al diffusion treatment or Cr diffusion treatment is further carried out thereon to increase the Al concentration or Cr concentration in the surface layer portion of the topcoat.

BEST MODE FOR CARRYING OUT THE INVENTION

Figure 1:
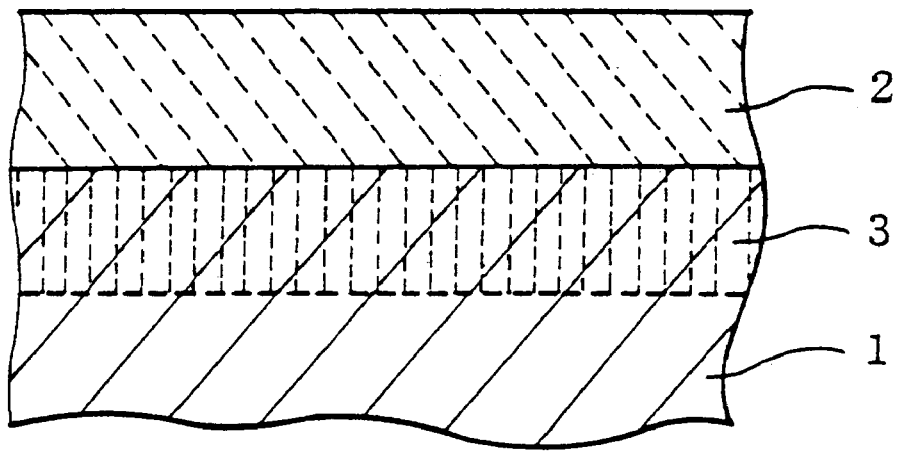
FIG. 1 is a partial diagrammatic view of a sectional structure in the conventional MCrAlX alloy sprayed coating.

The invention proposes a composite coating of MCrAlX alloy having a good adhesion property and an excellent resistance to high-temperature oxidation though an amount of diffusion into an inside of a substrate and a method of coating a surface thereof. The details of the structure of the composite coating will be described below. A. Undercoat MCrAlX alloy sprayed coating and the formation thereof;

As a substrate to be treated, there is used Ni-based alloy, Co-based alloy or the like frequently used as a gas turbine blade. After the surface of the substrate is degreased and roughened by blast treatment, MCrAlX alloy is applied at a thickness of 10~300 μm in air to form an undercoat coating. When the undercoat coating sprayed in air is heated or rendered into a molten state by a heat source for the spraying, it is oxidized by air (oxygen) invaded from the periphery of the heat source to formed an oxide film on the surface of the MCrAlX alloy particle. That is, the undercoat coating is constructed by the aggregate of the MCrAlX alloy particles covered with the oxide film. As a result of the inventors' investigation, the content of oxide in the MCrAlX alloy sprayed coating is 0.9~1.5 wt % in case of the formation through the atmospheric plasma spraying process and 0.1~0.15 wt % (in this case, value converted to oxygen) in case of the formation through the high-velocity flame spraying process.

The MCrAlX alloy particles covered at the surface with the oxide film are weak in the bonding force between mutual particles and are naturally insufficient in the adhesion property to the substrate and the coating itself is porous. Therefore, they are poor in the resistance to high-temperature oxidation and unsuitable as a coating for the gas turbine blade as it is. For this end, it is generally usual to solve the above drawback in the atmospheric plasma spraying process by applying a low pressure plasma spraying process containing substantially no oxygen. All of the sprayed coatings for the existing gas turbine blade are formed by the low pressure plasma spraying process.

However, the MCrAlX alloy sprayed coating formed by the low pressure plasma spraying process does not contain an oxide and possesses a chemically strong active force, so that when the gas turbine is used at a higher temperature, it excessively diffuses into the substrate to cause the problems as previously mentioned.

Under the above circumstance, the inventors have considered that if the oxide is previously included in the MCrAlX alloy coating, it obstructs the above diffusion and can solve the above problems accompanied with the use of the gas turbine at the higher temperature. That is, this point is a maximum reason why the atmospheric plasma spraying process or the high-velocity flame spraying process as a method of forming the undercoat is adopted in the invention.

Furthermore, the oxides in the MCrAlX alloy sprayed coating sprayed in air are constituted with oxides of the alloying components, such as CoO or NiO when M is Co or Ni, $Cr_2O_3$, $Al_2O_3$ and $Y_2O_3$ when X is Y or the oxide having the same components. And also, all oxides are inactive as compared with the metal component thereof and do not diffuse into the alloy of the substrate and are excellent in the heat resistance.

When the sprayed coating of the MCRAlX alloy containing the oxide as mentioned above is applied onto the surface of the substrate as an undercoat, even if the temperature of the use environment is not lower than 1000° C., the above oxide obstructs the diffusion of the MCrAlX alloy and hence the excessive diffusion into the inside of the substrate is eliminated. However, the oxide existing in the sprayed coating of the MCrAlX alloy formed in air is ununiform and the properties of the oxide itself become frequently incomplete state as compared with those of a stoichiometric oxide. On the other hand, many particles not oxidized are existent in the alloy.

Therefore, when such a sprayed coating is heated to a higher temperature, the diffusion into the inside of the substrate somewhat occurs. However, the diffusion rate and amount are very less as compared with those of the coating formed by the low pressure plasma spraying process. Moreover, it may be rather favorable to somewhat cause the internal diffusion in order that the MCrAlX alloy sprayed coating is stably existent on the surface of the substrate over a long time of period, so that the undercoat sprayed coating of the MCrAlX alloy through the atmospheric plasma spraying process is required to be a coating adapted to the above conditions.

When the content of the oxide is lacking only in the MCrAlX alloy sprayed coating through the atmospheric plasma spraying process, 0.2~20 wt % of oxide powder (particle size: 5~10 μm) as a constituent component of the MCrAlX alloy may previously be added to the spraying material, which may be sprayed to further control the diffusion into the inside of the substrate. In this case, when the addition amount of the oxide is less than 0.2 wt %, the action of obstructing the diffusion is less, while when it exceeds 20 wt %, the complete diffusion obstruction is inversely caused and the adhesion function as the undercoat is lost.

The thickness of the undercoat sprayed coating is within a range of 10~300 µm, preferably a range of 50~100 µm. When it is less than 10 µm, it is difficult to form the coating at an equal thickness by the spraying process, while when it exceeds 300 µm, the function as the diffusion obstruction is not improved and it is not economical.

B. Topcoat MCrAlX Alloy Sprayed Coating and the Formation Thereof;

The undercoat sprayed coating of the MCrAlX alloy containing the oxide is small in the diffusion rate into the inside of the substrate, but is weak in the bonding force between the particles constituting the coating as it is and is porous, so that when it is used under an operating environment of gas turbine at a high temperature, there is caused a problem that the body to be treated (e.g. a turbine blade) is oxidized at a high temperature or subjected to a high-temperature corrosion by a combustion gas component invaded from pores of the coating.

In order to solve this problem, according to the invention, a topcoat sprayed coating of MCrAlX alloy is further formed on the undercoat sprayed coating by a low pressure plasma spraying process in a non-oxidizing atmosphere. The topcoat sprayed coating is strong in the bonding force between the particles and good in the adhesion property to the undercoat sprayed coating.

After the formation of the topcoat sprayed coating, when the heat treatment is carried out in air or argon atmosphere or under vacuum at 1000~1170° C. for 1~5 hours, the pores of the topcoat sprayed coating are completely disappeared, whereby the resistance to high-temperature oxidation and the resistance to high-temperature corrosion can sufficiently be improved.

In a preferable embodiment, the surface of the coating after the formation of the topcoat sprayed coating is subjected to Al or Cr diffusion treatment, whereby a layer of a high Al or Cr concentration having an excellent oxidation resistance is formed on the outermost surface layer portion of the topcoat sprayed coating and also a stronger bonding force between the particles constituting the topcoat is developed.

As the Al or Cr diffusion treatment, use may be made of a powder process (the body to be treated is embedded in powder made of metallic Al, Al alloy powder, $Al_2O_3$ halide, metallic Cr, Cr alloy powder or the like and heated at 900~1100° C. for 3~10 hours), a chemical deposition process (metallic Al, metallic Cr are precipitated by subjecting an organic or inorganic Al, Cr compounds to heat decomposition or hydrogen reduction reaction and then adhered to the surface of the body to be treated), a physical deposition process (Al or Cr is evaporated by a heat source such as electron beam or the like and adhered to the surface of the body to be treated) and the like.

The thickness of the topcoat sprayed coating is within a range of 100~800 µm, preferably a range of 200~500 µm. When it is less than 100 µm, the resistance to high-temperature oxidation is insufficient, while when it exceeds 800 µm, the performances as the coating are not extremely improved and it is uneconomical.

Although the formation of the undercoat sprayed coating and the topcoat sprayed coating is described by taking the atmospheric plasma spraying process or the low-pressure plasma spraying process, the following process can be adopted as seen from the function and mechanism.

① In the formation of the undercoat, it is an essential condition that the oxide is included into the coating by spraying in air. In this meaning, combustion flame of combustible gas, explosion energy of combustible gas or the like may be used as a spraying heat source in addition to plasma.

② In the formation of the top coat, the low pressure plasma spraying process forming the coating in an atmosphere containing substantially no oxygen is optimum, but a pressure plasma spraying process or a spraying process using a laser as a heat source may be used if the atmosphere contains substantially no oxygen. And also, it can be said that it is possible to form the coating by a deposition process using an electron beam as a heat source in a vacuum vessel.

③ The combination of MCrAlX alloy materials used in the undercoat and the topcoat is not particularly restricted because the object of the invention can be attained even in any combination when the alloy is same components or may be represented by MCrAlX.

Figure 2:
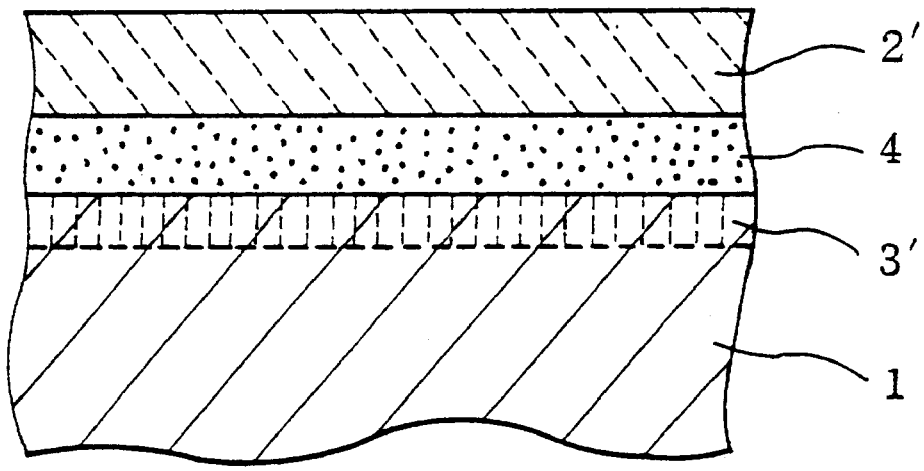
FIG. 2 is a partial diagrammatic view of a sectional structure in a spray coated member according to the invention.

FIG. 1 diagrammatically shows a sectional structure of the MCrAlX alloy sprayed coating formed by the conventional low pressure plasma spraying process, in which a MCrAlX alloy coating 2 is formed on a substrate 1 of a high-temperature exposed member. When the alloy coating is heated to a higher temperature above 1000° C., the alloying components deeply diffuse into the inside of the substrate 1. On the contrary, as shown in FIG. 2, in an invention example that an oxide-containing undercoat sprayed coating 4 of MCrAlX alloy i formed by the atmospheric plasma spraying process and then a topcoat sprayed coating 2 of MCrAlX alloy is formed thereon by a low pressure spraying process, the diffusion into the inside of the member to be exposed is slight even if it is heated to a higher temperature.

That is, according to the invention, there is a state of producing a diffusion layer 3' having a very slight thickness of not more than 70 µm, preferably not more than 60 µm, more particularly not more than 40 µm on the substrate 1.

Figure 3:
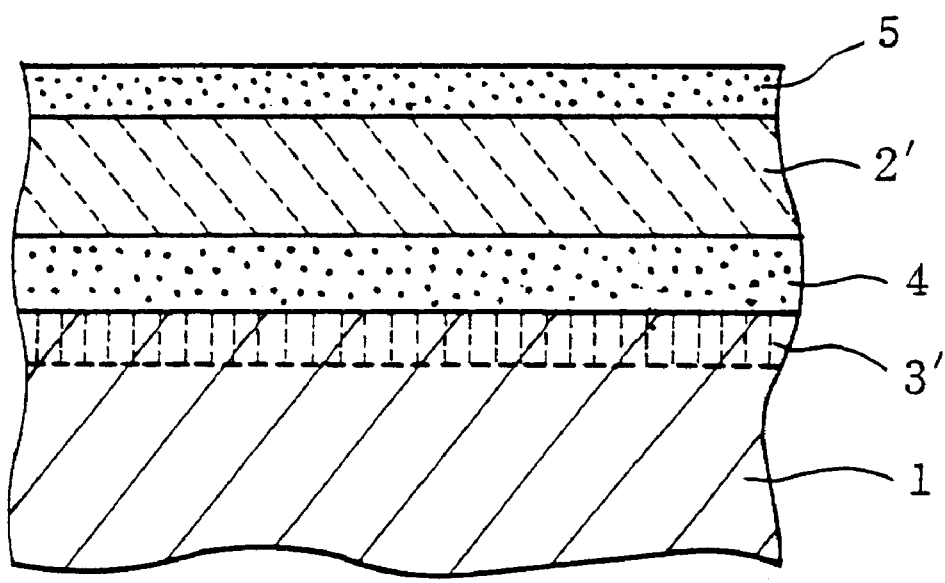
FIG. 3 is a partial diagrammatic view of a sectional structure in another composite spray coated member according to the invention.

Moreover, FIG. 3 shows an example that Al diffusion layer 5 is provided on an outermost surface layer portion of a topcoat sprayed coating 2.

Now, the chemical composition of the sprayed coating used in the invention is called as MCrAlX alloy as mentioned above, and a typical composition of this alloy is shown as follows.

M component: Ni (0~75 wt %), Co (0~70 wt %), Fe (0~30 wt %)

Cr component: 5~10 wt %

Al component: 1~29 wt %

X component: Y (0~5 wt %), Hf (0~10 wt %)

In the invention, Ta (1~20 wt %), Si (0.1~14 wt %), B (0~0.1 wt %), C (0~0.25 wt %), Mn (0~10 wt %), Zr (0~3 wt %), W (0~5.5 wt %), Cs, Ce, La (0~5 wt %, respectively), Pt (0~20 wt %) and the like may be added, if necessary, in addition to the above components.

EXAMPLES

Example 1

In this example, there are compared depths of diffusion layers into an inside of a Ni-based alloy substrate in composite sprayed coating according to the invention, which is formed on the surface of the Ni-based alloy substrate and consists of an undercoat sprayed coating of MCrAlX alloy formed by atmospheric plasma spraying process and a topcoat sprayed coating of MCrAlX alloy formed by low pressure plasma spraying process.

And also, various kinds of the MCrAlX alloy spraying materials are used in the following examples and chemical compositions thereof are shown in Table 1. That is, the spraying materials can be roughly divided into an alloy spraying material containing no Ni (A), alloy spraying material containing no Co (B, C, D, E), alloy material containing Ni and Co (F, G) and a material obtained by adding 5 wt % of Ta, which is not included in the other alloys, to the alloy G.

A. Test Specimens:

The Ni-based alloy (15.3 wt % Ni-7 wt % Fe-2.5 wt % Ti-2 wy % Mo-10 wt % Co-reminder Ni) is shaped into a rod test specimen having an outer diameter of 15 mm and a length of 50 mm, onto which is formed a coating having a thickness of 300 μm by using the MCrAlX alloy (A, C, E, F, G) shown in Table 1 through the following spraying process.

① Composite sprayed coating of MCrAlX alloy according to the invention

The MCrAlX alloy is applied at a thickness of 100 μm through the atmospheric plasma spraying process and then applied thereonto at a thickness of 200 μm through the low pressure plasma spraying process so as to have a total thickness of 300 μm.

② MCrAlX alloy sprayed coating of Comparative Example

The same MCrAlX alloy as mentioned above is applied at a thickness of 300 μm through the low-pressure plasma spraying process.

B. Heating Experimental Method:

After the test specimen of the MCrAlX alloy coating is heated in an electric furnace at 1100° C.×8 h while flowing argon gas, the test specimen is cut to observe a diffusion state of alloy coating components into the Ni-based alloy by means of an optical microscope.

C. Results:

In Table 2 are summarized results measured on the depth of the diffusion layer into the Ni-based alloy substrate by the above heating experiment. As seen from these results, the diffusion layer of single phase coating formed by the low pressure plasma spraying process of the comparative examples (Test specimen Nos. 6~10) reaches 87~98 μm, which shows a very diffusability.

On the contrary, the composite sprayed coating according to the invention (Test specimen Nos. 1~5) stop to a depth of 49~61 μm and there is recognized a state of shallowing the diffusion into the inside of the Ni-based alloy.

TABLE 1

| Symbol | Chemical composition (wt %) | | | | | |
| --- | --- | --- | --- | --- | --- | --- |
|  | Ni | Co | Cr | Al | Y | Ta |
| A |  | 63.4 | 23 | 13 | 0.6 |  |
| B | 76.5 |  | 17 | 6 | 0.5 |  |
| C | 67.0 |  | 22 | 10 | 1.0 |  |
| D | 70.6 |  | 23 | 6 | 0.4 |  |
| E | 77.2 |  | 16 | 6 | 0.8 |  |
| F | 32.0 | 38.5 | 21 | 8 | 0.5 |  |
| G | 10.0 | 52.8 | 25 | 7 | 0.6 | 5 |

TABLE 2

| No. | McrAlX Alloy | Structure and thickness of coating (μm) Kind of spraying | | Thickness of diffusion layer (μm) (1100° C. × 8 h) | Remarks |
| --- | --- | --- | --- | --- | --- |
|  |  | Undercoat Atmospheric plasma | Topcoat Low pressure plasma |  |  |
| 1 | A | 100 | 200 | 49 | Acceptable |
| 2 | C | 100 | 200 | 60 | Example |
| 3 | E | 100 | 200 | 61 |  |
| 4 | F | 100 | 200 | 54 |  |
| 5 | G | 100 | 200 | 50 |  |
| 6 | A |  | 300 | 88 | Comparative |
| 7 | C |  | 300 | 95 | Example |
| 8 | E |  | 300 | 98 |  |
| 9 | F |  | 300 | 94 |  |
| 10 | G |  | 300 | 87 |  |

Note (1) A sprayed coating of McrAlX alloy in Specimens No. 6–10 is only one layer of 300 μm formed by a low pressure plasma spraying process.

Example 2

In this example, a test specimen is prepared by applying MCrAlX alloy added with oxide powder (particle size: 0.5~10 μm) of CoO, NiO, $Cr_2O_3$, $Al_2O_3$, $Y_2O_3$ alone or in admixture at a thickness of 100 μm as an undercoat through the atmospheric plasma spraying process and forming a coating of MCrAlX alloy containing no oxide powder at a thickness of 300 μm as a topcoat thereon through the low pressure plasma spraying process and then subjected to the heating experiment under the same conditions as in Example 1 to measure the depth of the diffusion layer.

A. Test Specimen:

① Composite sprayed coating of MCrAlX alloy according to the invention

A spraying material obtained by adding MCrAlX alloy (C) with one or more of CoO, NiO, $Cr_2O_3$, $Al_2O_3$ and $Y_2O_3$ (addition amount: 2.0~3.0 wt %) is applied onto the Ni-based alloy substrate through the atmospheric plasma spraying process to from an undercoat having a thickness of 100 μm and then MCrAlX alloy coating containing no oxide powder is formed at a thickness of 300 μm thereon as a topcoat through the low pressure plasma spraying process.

② MCrAlX alloy coating of Comparative Example

The coating of the comparative example corresponds to (test specimen No. 7 of Table 2) in Example 1.

B. Heating Experimental Method:

Same as in Example 1

C. Results:

The experimental results are summarized in Table 3. As seen from this table, when the MCrAlX alloy coating containing the oxide powder is formed as the undercoat, the formation of the diffusion layer into the inside of the Ni-based alloy substrate stops to a range of 28–40 μm, from which it is confirmed that the diffusion is further controlled as compared with 60 μm in the atmospheric plasma sprayed coating (Test specimen No. 8) not added with the oxide powder. And also, the effect by the addition of the oxide alone is recognized in ferritic stainless steel.

TABLE 3

| No. | MCrAlX Alloy | Kind and amount of oxide added to McrAlX alloy (wt %) | | | | | Structure and thickness of coating ($\mu$m) | | Thickness of diffusion layer ($\mu$m) | Remarks |
| --- | --- | --- | --- | --- | --- | --- | --- | --- | --- | --- |
| | | CoO | NiO | $Cr_2O_3$ | $Al_2O_3$ | $Y_2O_3$ | Undercoat Atmospheric plasma | Topcoat Low pressure plasma | 1100° C. × 8 h | |
| 1 | C | 0.5 | 0.5 | 0.5 | 0.5 | 0.5 | 100 | 300 | 49 | Acceptable Example |
| 2 | | | | | 2.0 | | 100 | 300 | 60 | |
| 3 | | | | | | 2.0 | 100 | 300 | 61 | |
| 4 | | | 2.0 | | | | 100 | 300 | 54 | |
| 5 | | 2.0 | | | | | 100 | 300 | 50 | |
| 6 | | | | | 1.5 | 1.5 | 100 | 300 | 30 | |
| 7 | | | 0.5 | | 1.0 | 1.5 | 100 | 300 | 33 | |
| 8 | | | | | | | 100 | 200 | 60 | |

Note
(1) In test specimen No. 8 are transferred the data of test specimen No. 2 in the Acceptable Example of table 2 in Example 1.
(2) The depth of the diffusion layer when C alloy is directly sprayed onto the surface of the Ni-based alloy substrate through the low pressure plasma spraying process is 95 $\mu$m. (Test specimen No. 7 in Table 2 of Example 1).

Example 3

In this example, an undercoat having a thickness of 100 $\mu$m is formed on the same Ni-based alloy substrate as in Example 1 by using the MCrAlX alloy added with the above oxide powder through the flame spraying process using a combustion energy of hydrocarbon/oxygen as a heat source, and the MCrAlX alloy sprayed coating containing no oxide powder is formed thereon at a thickness of 300 $\mu$m as a top coat to prepare a test specimen, which is subjected to a heating experiment under the same conditions as in Example 1 to measure the depth of the diffusion layer.

A. Test Specimen:

① Composite sprayed coating of MCrAlX alloy according to the invention

The undercoat having a thickness of 100 $\mu$m is formed on the Ni-based alloy substrate by adding CoO, NiO, $Cr_2O_3$, $Al_2O_3$, $Y_2O_3$ alone or in admixture (addition amount: 2.0~4.0 wt %) to MCrAlX alloy (E), and MCrAlX alloy (E) containing no oxide is laminated thereonto at a thickness of 300 $\mu$m through the low-pressure spraying process. And also, there is provided an alloy (E) coating containing no oxide.

② MCrAlX alloy sprayed coating of Comparative Example
The coating of the comparative example corresponds to (Test specimen No. 8 of Table 2) in Example 1.

B. Heating Experimental Method:
Same method as in Example 1.

C. Results:

The experimental results are shown in Table 4. As seen from this table, it is confirmed that the depth of the diffusion layer into the inside of the Ni-based alloy substrate is made shallower by incorporating the oxide powder into the MCrAlX alloy (F). That is, even in the flame sprayed coating (Test specimen No. 7), the depth of the diffusion layer stops to 60 $\mu$m as compared with that of 98 $\mu$m in the low pressure plasma sprayed coating of the same alloy (Test specimen No. 8 of Table 2), while when the oxide powder is added to the alloy, the depth of the diffusion layer is made further smaller and is within a range of 28~40 $\mu$m. That is, even in this example, the similar effect is recognized by adding the oxides alone or in admixture, so that it is confirmed that the oxide is stably existent even when the spraying conditions (alloy, spraying process) are changed, and functions as an obstruction preventing the diffusion action of the metal.

TABLE 4

| No. | MCrAlX Alloy | Kind and amount of oxide added to McrAlX alloy (wt %) | | | | | Structure and thickness of coating ($\mu$m) | | Thickness of diffusion layer ($\mu$m) | Remarks |
| --- | --- | --- | --- | --- | --- | --- | --- | --- | --- | --- |
| | | CoO | NiO | $Cr_2O_3$ | $Al_2O_3$ | $Y_2O_3$ | Undercoat Atmospheric plasma | Topcoat Low pressure plasma | 1100° C. × 8 h | |
| 1 | E | 0.5 | 0.5 | 0.5 | 0.5 | 0.5 | 100 | 300 | 28 | Acceptable Example |
| 2 | | | | | 2.0 | | 100 | 300 | 32 | |
| 3 | | | | | | 2.5 | 100 | 300 | 35 | |
| 4 | | | 3.0 | | | | 100 | 300 | 40 | |
| 5 | | | | | 2.0 | 2.0 | 100 | 300 | 36 | |
| 6 | | | 1.0 | 0.5 | 0.5 | 1.0 | 100 | 300 | 38 | |
| 7 | | | | | | | 100 | 300 | 63 | |

TABLE 4-continued

| | | Kind and amount of oxide added to McrAlX alloy (wt %) | | | | | Structure and thickness of coating (μm) | | Thickness of diffusion layer (μm) | |
|---|---|---|---|---|---|---|---|---|---|---|
| | | | | | | | Undercoat Atmospheric | Topcoat Low pressure | | |
| No. | McrAlX Alloy | CoO | NiO | $Cr_2O_3$ | $Al_2O_3$ | $Y_2O_3$ | plasma | plasma | 1100° C. × 8 h | Remarks |

Note (1) The depth of the diffusion layer in the coating made from E alloy through low pressure plasma spraying process is 98 μm. (Test specimen No. 8 of Table 2 in Example 1)

Example 4

In this example, the adhesion properties of the coatings are compared by subjecting the composite sprayed coating formed on the Ni-based alloy substrate according to the invention or the coating consisting of the atmospheric plasma sprayed coating of MCrAlX alloy (undercoat) and low pressure plasma sprayed coating of the same alloy (topcoat) to a thermal shock test.

A. Test Specimen:

① Composite sprayed coating of MCrAlX alloy according to the invention

Onto the Ni-based alloy substrate used in Example 1 is formed the undercoat having a thickness of 100 μm by using four kinds of MCrAlX alloy (A, B, C, D) through the atmospheric plasma spraying process, and the topcoat having a thickness of 200 μm is formed thereon by using the same MCrAlX alloy through low pressure plasma spraying process.

② MCrAlX alloy sprayed coating of Comparative Example a. Onto the above Ni-based alloy substrate is formed the coating having a thickness of 300 μm by using the same four kinds of MCrAlX alloy (A, B, C, D) through the atmospheric plasma spraying process.

b. Onto the above Ni-based alloy substrate is formed the coating having a thickness of 300 μm by using the same four kinds of MCrAlX alloy (A, B, C, D) through low pressure plasma spraying process.

B. Al Diffusion Treatment:

The Al diffusion treatment is applied to a half of test specimens of the composite sprayed coatings according to the invention and the atmospheric plasma sprayed coating of the comparative example and all of the low pressure plasma sprayed coatings for the topcoat. The conditions are as follows:

Diffusion component (Ni—Al alloy 30 wt %, $Al_2O_3$ 69 wt %, $NH_4Cl$ 1 wt %)

Treating conditions: 930° C.×4 h

C. Results:

The experimental results are shown in Table 5. As seen from this table, in the atmospheric plasma sprayed coatings of the comparative example (Test specimen Nos. 5~8), the coating of the MCrAlX alloy is peeled off by repeating the thermal shock 12~16 times. When being subjected to the Al diffusion treatment, the effect is somewhat observed, but Cis insufficient.

On the contrary, the low pressure plasma sprayed coatings (Test specimen Nos. 9~12) are durable to thermal shock of not less than 25 times and maintain a good sound state and show a good adhesion property even in the comparative example. However, these coatings have a drawback that the formation of the diffusion layer into the inside of the Ni-based alloy becomes large as shown in Example 1 (Table 2).

The sprayed coatings according to the invention (Test. specimen Nos. 1~4) are durable to thermal shock of 25 times likewise the low pressure plasma sprayed coating and recognize the good adhesion property. This is considered due to the fact that the dense low pressure sprayed coating is formed on the atmospheric plasma sprayed coating having a low adhesion property, whereby air invaded from the pore portions of the coating is shut off to develop the effect of preventing the oxidation of the Ni-based alloy substrate.

The thermal shock test in Table 5 is such a thermal shock test that an operation of heating each test specimen of the sprayed coating at 1000° C.×30 minutes in an electric furnace of an atmosphere and then charging into water at 25° C. is one cycle, and the appearance of the coating is visually observed every one cycle to examine the presence or absence of the peeling.

TABLE 5

| | | Structure and thickness of coating (μm) | | | Results of thermal shock test |  |
|---|---|---|---|---|---|---|
| | | Kind of spraying | | | 1000° C. × 30 min | |
| No. | McrAlX Alloy | Undercoat Atmospheric plasma | Topcoat Low pressure plasma | Al diffusion treatment | charged into water at 25° C. Number until peeling occurs | Remarks |
| 1 | A | 100 | 200 | Presence | Not less than 25 times | Acceptable Example |
| 2 | B | 100 | 200 | Absence | Not less than 25 times | |

TABLE 5-continued

| No. | McrAlX Alloy | Structure and thickness of coating (μm) | | | Results of thermal shock test 1000° C. × 30 min charged into water at 25° C. Number until peeling occurs | Remarks |
|---|---|---|---|---|---|---|
| | | Kind of spraying | | | | |
| | | Undercoat Atmospheric plasma | Topcoat Low pressure plasma | Al diffusion treatment | | |
| 3 | C | 100 | 200 | Presence | Not less than 25 times | |
| 4 | D | 100 | 200 | Absence | Not less than 25 times | |
| 5 | A | 300 | | Presence | Local peeling at 16 times | Comparative Example |
| 6 | B | 300 | | Absence | Peeling at 12 times | |
| 7 | C | 300 | | Presence | Local peeling at 16 times | |
| 8 | D | 300 | | Absence | Peeling at 12 times | |
| 9 | A | | 300 | Presence | Not less than 25 times | |
| 10 | B | | 300 | Presence | Not less than 25 times | |
| 11 | C | | 300 | Presence | Not less than 25 times | |
| 12 | D | | 300 | Presence | Not less than 25 times | |

Note
(1) Each McrAlX alloy sprayed coating of test specimen Nos. 5–8 is a single coating of 300 μm in thickness through atmospheric plasma spraying process.
(2) Each McrAlX alloy sprayed coating of test specimen Nos. 9–12 is a single coating of 300 μm in thickness through low pressure plasma spraying process.
(3) Al diffusion treatment is carried out at 930° C. × 4 h.
(4) The judgement of thermal shock test is represented by the number when 5% of the coating area is peeled off.

Example 5

In this example, test for high-temperature corrosion and test for high-temperature sulfurization are made with respect to products obtained by forming the composite sprayed coating of MCrAlX alloy according to the invention onto Ni-based alloy substrate or Co-based alloy substrate, and the resistance to high-temperature environment is compared with those of single sprayed coating of MCrAlX alloy formed by the atmospheric plasma spraying process or low pressure plasma spraying process as a comparative example.

A. Test Specimen:

① Composite sprayed coating of MCrAlX alloy according to the invention

A test specimen of 30 mm width×50 mm length×5 mm thickness is prepared by using the following two heat-resistant alloys as a substrate to be sprayed.
  a. Ni-based alloy: same as in Example 1
  b. Co-based alloy: 29.5 wt % Cr-10.5 wt % Ni-7.0 wt % W-2 wt % Fe-reminder Co An undercoat of 100 μm in thickness is formed by using MCrAlX alloy (A, C, E, G) as a spraying material through the atmospheric plasma spraying process and a topcoat of 300 μm in thickness is formed thereon by using the same MCrAlX alloy.

② Single sprayed coating of MCrAlX alloy of Comparative Example
  a. A coating of 300 μm in thickness is formed on the above Ni-based alloy substrate or Co-based alloy substrate by using the same four MCrAlX alloys (A, C, E, G) through the atmospheric plasma spraying process.
  b. And also, a sprayed coating of 400 μm in thickness is formed by using the same MCrAlX alloy as in the invention through the low pressure plasma spraying process as a comparative example.

B. Al Diffusion Treatment

The Al diffusion treatment as shown below is applied to a half of test specimens of the composite sprayed coatings according to the invention and the atmospheric plasma sprayed coating of the comparative example and all of the low pressure plasma sprayed coatings for the topcoat.

Diffusion component: same as in Example 4

Treating conditions: same as in Example 4

C. Results:

In Table 6 are summarized the above test results for high-temperature corrosion. In the section of the atmospheric plasma sprayed coating of the comparative examples (Test specimen Nos. 5~8), corrosion components (V and S in vanadium corrosion, S and Cl in high-temperature sulfurization corrosion) very deeply penetrates into the inside of the coating (65~135 μm), while the penetration of the corrosion components stops to a range of 20~70 μm in the composite sprayed coatings according to the invention, and the resistance to high-temperature corrosion is excellent.

The resistance to high-temperature corrosion of the coating according to the invention is equal to those (20=71 μm) of the low pressure plasma sprayed coatings of the comparative examples (Test specimen Nos. 9~12) used in the existing technique. The coating according to the invention holds the sufficient resistance to high-temperature corrosion against the corrosion components constituting the combustion gas atmosphere.

And also, the effect of the Al diffusion treatment is recognized in the vanadium corrosion test and the high-temperature sulfurization test.

As seen from the above results, in the atmospheric plasma sprayed coating, the penetration of the corrosion components is easy due to many pores, which is a big cause of lowering the resistance to high-temperature corrosion, and also even if the Al diffusion treatment is conducted, the pores are not completely sealed. On the contrary, the low pressure plasma sprayed coating is dense at the film formed state and it is considered that the densification is more improved by the Al diffusion treatment to prevent the penetration of the corrosion components.

The high-temperature corrosion test in Table 6 is carried out as follows.

①  Vanadium corrosion test: composition of agent: 80% $V_2O_5$-20% NaCl
temperature×time: 900° C.×3 h ② High-temperature sulfurization test:
composition of agent: 90% $Na_2SO_4$-10% NaCl
temperature×time: 1000° C.×4 h Moreover, the amount of the agent applied is 25 mg per 1 $cm^2$ of the sprayed coating in both the tests. The coating is held at given temperature and time in an electric furnace and then taken out therefrom to inspect the section of the coating at the corroded portion and observe the penetration depth of the corrosion components by means of an X-ray microanalyzer, whereby the resistance to high-temperature corrosion of the coating is examined.

Ni-based alloy substrate as in Example 1 through a high-velocity flame spraying process and then forming a topcoat of 300 μm in thickness made from MCrAlX alloy spraying material containing no oxide thereon through a low pressure plasma spraying process, and subjected to the same heating test as in Example 1 to examine the depth of the diffusion layer.

A. Test Specimen:

① Composite sprayed coating of MCrAlX alloy according to the invention

The undercoat having a thickness of 100 μm is formed on the Ni-based alloy substrate by adding MgO, $SiO_2$, $ZrO_2$ alone or in admixture (addition amount: 3~5 wt %) to MCrAlX alloy (C) through the high-velocity flame spraying process, and MCrAlX alloy containing no oxide is laminated thereonto at a thickness of 300 μm through the low pressure spraying process.

② MCrAlX alloy sprayed coating of Comparative Example

The coating of the comparative example corresponds to (Test specimen No. 7 of Table 2) in Example 1.

B. Heating Experimental Method:
Same as in Example 1.

C. Results:

The experimental results are summarized in Table 7. As seen from these results, when the undercoat is made from the MCrAlX alloy containing the oxide powder, the formation of the diffusion layer in the inside of the Ni-based alloy substrate stops to a range of 31~45 μm and also the effect is effective in the addition of the oxide powders alone or in admixture.

TABLE 6

| | | Structure and thickness of coating (μm) | | | Penetration rate through corrosion (μm) | | |
|---|---|---|---|---|---|---|---|
| | | Kind of spraying | | | | | |
| No. | McrAlX Alloy | Undercoat Atmospheric plasma | Topcoat Low pressure plasma | Al diffusion treatment | High-temperature corrosion test | High-temperature sulfurization test | Remarks |
| 1 | A | 100 | 300 | Presence | 20~55 | 26~70 | Acceptable |
| 2 | C | 100 | 300 | Absence | 28~61 | 25~68 | Example |
| 3 | E | 100 | 300 | Presence | 22~59 | 22~70 | |
| 4 | G | 100 | 300 | Absence | 25~70 | 29~55 | |
| 5 | A | 400 | | Presence | 80~120 | 65~130 | Comparative |
| 6 | C | 400 | | Absence | 95~130 | 80~135 | Example |
| 7 | E | 400 | | Presence | 85~120 | 95~120 | |
| 8 | G | 400 | | Absence | 100~130 | 98~128 | |
| 9 | A | | 400 | Presence | 20~60 | 28~71 | |
| 10 | C | | 400 | Presence | 26~65 | 28~68 | |
| 11 | E | | 400 | Presence | 28~68 | 25~60 | |
| 12 | G | | 400 | Presence | 23~60 | 25~50 | |

Note
(1) The McrAlX alloy coating of test specimen Nos. 5–8 is a single coating of 400 μm in thickness through atmospheric plasma spraying process.
(2) The McrAlX alloy sprayed coating of test specimen Nos. 9–12 is a single coating of 400 μm in thickness through atmospheric plasma spraying process.
(3) Al diffusion test is carried out at 950° C. × 4 h.
(4) High-temperature corrosion test: 80% $V_2O_5$-20% $Na_2O_4$, 900° C. × 3 h
(5) High-temperature sulfurization test: 90% $Na_2O_4$-10% NaCl, 100° C. × 4 h
(6) The substrate of the test specimen in an even number is Co-based alloy (29.5% Cr-10.0% Ni-7.0% W-2.0% W-reminder % Co), and that in an odd number is Ni-based alloy (described in Example 1).

Example 6

In this example, a test specimen is prepared by using MCrAlX alloy spraying material added with an oxide powder (particle size: 0.5~10 μm) of MgO, $SiO_2$ and/or $ZrO_2$ to form an undercoat of 100 μm in thickness on the same As seem from the above, the oxide powder controls the formation of the diffusion layer when the oxide maintains a stable state at a high temperature in addition to the MCrAlX alloy components.

TABLE 7

| | | Kind and amount of oxide added to McrAlX alloy (wt %) | | | Structure and thickness of coating ($\mu$m) | | | |
|---|---|---|---|---|---|---|---|---|
| No. | McrAlX Alloy | MgO | SiO$_2$ | ZrO$_2$ | Undercoat High-velocity flame | Topcoat Low pressure plasma | Thickness of diffusion layer ($\mu$m) | Remarks |
| 1 | C | 1.0 | 1.0 | 1.0 | 100 | 100 | 42 | Acceptable Example |
| 2 | | 5.0 | | | 100 | 300 | 40 | |
| 3 | | | | 4.5 | 100 | 300 | 38 | |
| 4 | | | 3.5 | 1.0 | 100 | 300 | 31 | |
| 5 | | 2.5 | 2.5 | | 100 | 300 | 45 | |
| 6 | | | | | 100 | 200 | 60 | |

Note
(1) Test specimen No. 6 shows data transcripted from those of test specimen No. 2 in an acceptable example of Table 2 of Example 1, provided that undercoat is formed through atmospheric plasma spraying process.
(2) Depth of diffusion layer in the coating directly made from C alloy through low pressure plasma spraying process is 95 $\mu$m. (Example 1, Table 2, test specimen No. 7)

INDUSTRIAL APPLICABILITY

As seen from the above explanations and the results of the examples, the composite sprayed coating of MCrAlX alloy consisting of the oxide sprayed coating and non-oxide sprayed coating according to the invention is small in the thickness of the diffusion layer into the inside of the member to be exposed even if the environment temperature becomes higher, so that it is shows a good resistance to thermal shock and develops an excellent performance to the resistance to high-temperature corrosion.

As a result, the member sprayed with MCrAlX alloy according to the invention is possible to be produced in a good productivity and a low cost by using the same kind of the spraying process and the same kind of metal in a field of gas turbine anticipating the rise of the temperature in future.

And also, the invention is suitable as a high temperature member used in a blast furnace, a heat treating furnace or the like, or a heat-resistant member used in rocket, space shuttle or the like.

What is claimed is:

1. A spray coated member for use at a high temperature, having a composite sprayed coating comprised of an oxide-containing undercoat sprayed coating obtained by spraying a MCrAlX alloy spraying material (wherein M is one or more of Ni, Co and Fe, and X is one or more of Y, Hf, Ta, Cs, Pt, Ce, Zr, La, Si and Th) onto a surface of a heat-resistant alloy substrate in air and a non-oxide topcoat sprayed coating obtained by spraying a MCrAlX alloy spraying material (wherein M is one or more of Ni, Co and Fe, and X is one or more of Y, Hf, Ta, Cs, Pt, Ce, Zr, La, Si and Th) onto the undercoat under a low pressure containing substantially no oxygen.

2. A spray coated member according to claim 1, wherein said undercoat sprayed coating comprises at least one of CoO, NiO, Cr$_2$O$_3$, Al$_2$O$_3$, Y$_2$O$_3$, MgO, SiO$_2$, or ZrO$_2$.

3. A spray coated member according to claim 1, wherein a total amount of oxide powder included in the undercoat sprayed coating is within a range of 0.2~20% by weight.

4. A spray coated member according to claim 1, wherein the undercoat sprayed coating has a thickness within a range of 10~300 $\mu$m.

5. A spray coated member according to claim 1, wherein the topcoat sprayed coating has a thickness within a range of 100~800 $\mu$m.

6. A spray coated member according to claim 1, wherein the topcoat sprayed coating has further a Al or Cr diffused layer at its surface side.

7. A spray coated member according to claim 1, wherein a thin diffusion layer of an alloying component of not more than 70 $\mu$m is formed on the surface of the substrate when being heated under conditions of 1100° C. for 8 hours.

8. A spray coated member according to claim 6, wherein a thin diffusion layer of an alloying component of not more than 70 $\mu$m is formed on the surface of the substrate when being heated under conditions of 1100° C. for 8 hours.

9. A method of producing a spray coated member for use at a high temperature, comprising forming an oxide-containing undercoat sprayed coating by spraying a MCrAlX alloy material (wherein M is one or more of Ni, Co and Fe, and X is one or more of Y, Hf, Ta, Cs, Pt, Ce, Zr, La, Si and Th) onto a surface of a heat-resistant alloy substrate in air through a film-formable spraying process and then a non-oxide topcoat sprayed coating is formed thereon by spraying a MCrAlX alloy material (wherein M is one or more of Ni, Co and Fe, and X is one or more of Y, Hf, Ta, Cs, Pt, Ce, Zr, La, Si and Th) under a low-pressure containing substantially no oxygen through a film-formable spraying process.

10. The method according to claim 9, wherein a mixture of MCrAlX alloy and at least one of one or more oxides comprising CoO, NiO, Cr$_2$O$_3$, Al$_2$O$_3$, Y$_2$O$_3$, MgO, SiO$_2$, or ZrO$_2$ is used as a spraying material for the undercoat.

11. The method according to claim 9, wherein after the formation of the topcoat coating, a heat treatment is carried out in air or argon atmosphere or under vacuum at 1000~1170° C. for 1~5 hours with respect to the topcoat coating.

12. The method according to claim 9, wherein after the formation of the topcoat, Al diffusion treatment or Cr diffusion treatment is further carried out thereon to increase the Al concentration or Cr concentration in the surface layer portion of the topcoat.

13. The method according to claim 12, wherein after the formation of the topcoat coating, a heat treatment is carried out in air or argon atmosphere or under vacuum at 1000~1170° C. for 1~5 hours with respect to the topcoat coating.

* * * * *